3,476,765
CERTAIN SUBSTITUTED ISOXAZOLES
Raymond U. Lemieux, Edmonton, and Ronald G. Micetich, Sherwood Park, Alberta, Canada, assignors to R & L Molecular Research Ltd., Edmonton, Alberta, Canada, a body corporate
No Drawing. Continuation-in-part of application Ser. No. 515,216, Dec. 20, 1965. This application Sept. 27, 1966, Ser. No. 582,270
Int. Cl. C07d 99/14, 91/30
U.S. Cl. 260—302                    10 Claims This application is a continuation in part of our prior copending application Ser. No. 515,216 filed on Dec. 20, 1965, now U.S. Patent 3,311,611.

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive bacteria and especially *Staphylococcus aureus* and, more particularly, relates to novel 6-[5'- (or 3'-) (lower)alkoxy-3'- (or 5'-) phenylisothiazole-4-carboxamido]penicillanic acids which may bear certain substituents on the benzene ring, and nontoxic, pharmaceutically acceptable salts thereof.

It was a particular object of the present invention to provide alternative and improved agents for the treatment of infections caused by resistant strains of bacteria, e.g. benzyl-penicillin-resistant strains of *Staphylococcus aureus* (*Micrococcus pyogenes* var. *aureus*), or for the decontamination of objects bearing such organisms, e.g. hospital equipment, walls of operating rooms and the like.

The objects of the present invention have been achieved by the provision according to the present invention, of a compound selected from the group consisting of acids of the formulae

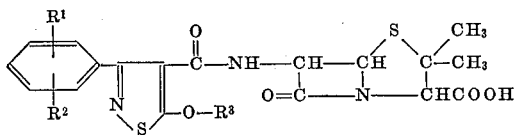

and

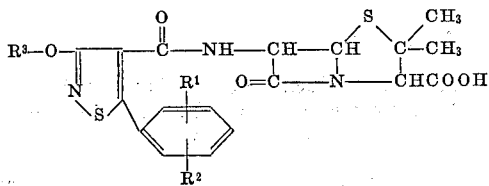

wherein $R^1$ and $R^2$ are each hydrogen, chloro, bromo, iodo, (lower)alkyl, (lower)alkoxy or trifluoromethyl and $R^3$ represents (lower)alkyl; and nontoxic, pharmaceutically acceptable salts thereof.

The preferred embodiments of the present invention are the compounds of the formulae set out above in which $R^1$ and $R^2$ are both hydrogen or both chloro, e.g. 2',6'-dichloro or $R^1$ is hydrogen and $R^2$ is chloro, e.g. 2'-chloro or 4'-chloro, and $R^3$ is methyl or ethyl.

The present invention includes the process of preparing penicillins of the formulae

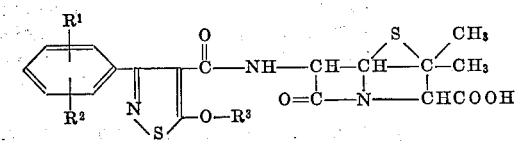

and

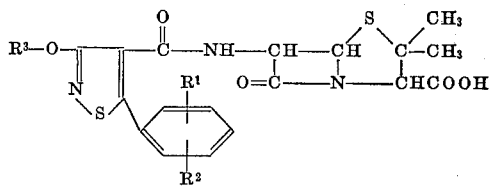

wherein each of $R^1$ and $R^2$ is either hydrogen, chloro, bromo, iodo, (lower)alkyl, (lower)alkoxy or trifluoromethyl and $R^3$ is (lower)alkyl and nontoxic salts thereof which comprises chemically coupling with 6-aminopenicillanic acid or a salt thereof either (a) an acid chloride of the formulae

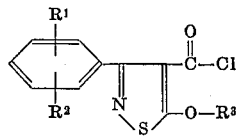

and

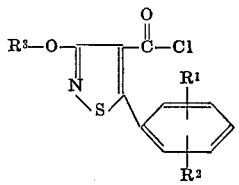

wherein $R^1$, $R^2$ and $R^3$ have the meaning set forth above, or (b) the functional equivalent of said acid chloride as an acylating agent for a primary amino group. Such equivalents include the corresponding carboxylic acid bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g. with p-nitrophenol, 2,4-dinitrophenol, thiophenol, thioacetic acid) may be used or the free acid itself may be coupled with 6-aminopenicillanic acid after first reacting said free acid with N,N'-dimethylchloroformiminium chloride [cf. Great Britain 1,008,170 and Novak and Weichet, Experientia XXI/6, 360 (1965)] or by the use of enzymes or of an N,N'-carbonyldi-imidazole or an N,N'-carbonylditriazole [cf. South African patent specification 63/2684], of a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc. 77, 1067 (1955)], or of alkynylamine reagent [cf. R. Buijle and H. G. Viehe, Angew. Chem. International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. The methods for carrying out these reactions to produce a penicillin and the methods used to isolate the penicillins so produced are well-known in the art.

The nontoxic, pharmaceutically acceptable salts include metallic salts such as sodium, potassium, calcium and aluminium, the ammonium salt and substituted ammonium salts, e.g. salts of such nontoxic amines as trialkylamines, including triethylamine, proacine, dibenzylamine, N-benzyl-beta-phenethylamine, 1-ephenamine, N,N'-dibenzylethylenediamine, dehydroabietylamine, N,N'-bis-dehydroabietylethylenediamine, N - (lower)alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, n-butyl, isobutyl, t-butyl, amyl, hexyl, 2-ethylhexyl, heptyl, decyl, etc. Also included within the scope of the present invetion are easily hydrolyzed esters and amides which are converted to the free acid form by chemical or enzymatic hydrolysis.

The 3-alkoxy-5-arylisothiazole-4-carboxylic acids used in the present invention are prepared in the manner exemplified in Examples 1 and 3 from known esters of benzoic acid or substituted benzoic acids according to the following reaction scheme in which Ar represents the group

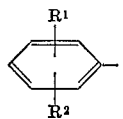

in which R¹ and R² have the meaning set out above and R³ represents a (lower)alkyl group:

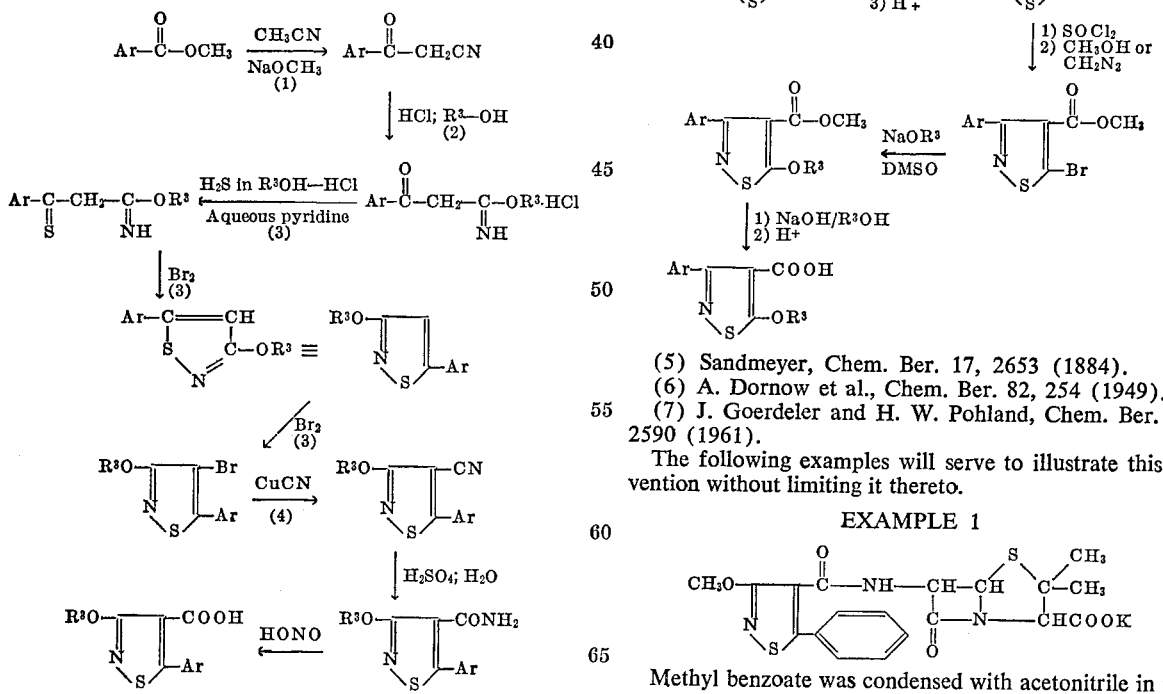

(1) R. S. Long, J. Amer. Chem. Soc. 69, 992 (1947).
(2) B. Roth et al., J. Amer. Chem. Soc 71, 616 (1949).
(3) J. Goerdeler et al., Chem. Berichte, 96, 944 (1963).
(4) L. Friedman and H. Schechter, J. Org. Chem., 26, 2522 (1961).

The 5-alkoxy-3-arylisothiazole-4-carboxylic acids used in the present invention are prepared in the manner emplified in Example 4 from known benzonitriles or anilines according to the following reaction scheme in which Ar represents the group

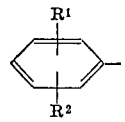

in which R¹ and R² have the meaning set out above and R³ represents a (lower)alkyl group:

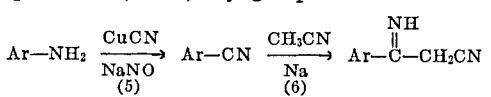

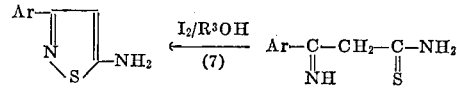

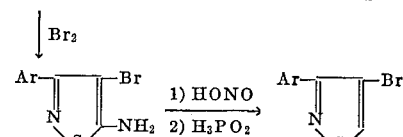

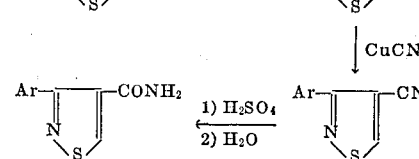

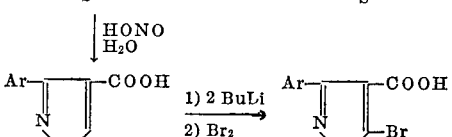

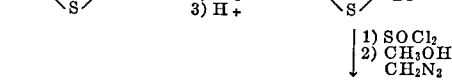

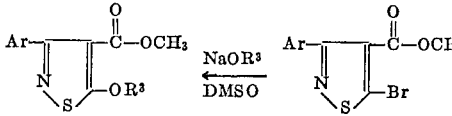

(5) Sandmeyer, Chem. Ber. 17, 2653 (1884).
(6) A. Dornow et al., Chem. Ber. 82, 254 (1949).
(7) J. Goerdeler and H. W. Pohland, Chem. Ber. 94, 2590 (1961).

The following examples will serve to illustrate this invention without limiting it thereto.

EXAMPLE 1

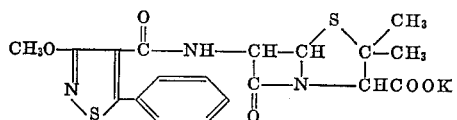

Methyl benzoate was condensed with acetonitrile in the presence of sodium methoxide following the directions of R. S. Long [J. Amer. Chem. Soc. 69, 992 (1947)] to yield benzoylacetonitrile.

The benzoylacetonitrile was reacted with methanolic hydrogen chloride to form the hydrochloride of the imino methyl ester of benzoylacetic acid according to the procedure of B. Roth and J. M. Smith [J. Amer. Chem. Soc. 71, 616 (1949)].

The foregoing iminoester was reacted with hydrogen sulfide in methanolic hydrogen chloride and the product was treated with aqueous pyridine following the directions described by J. Goerdeler and W. Mittler [Chem. Ber. 96, 944 (1963)] to form the iminomethyl ester of thiobenzoylacetic acid. This compound was then oxidized with bromine in pyridine-ethyl acetate solution to yield 3-methoxy-5-phenylisothiazole. The compound was then brominated to 4-bromo-3-methoxy-5-phenylisothiazole, the starting material in our syntheses of new compounds. The latter two steps were carried out following the directions of Goerdeler and Mittler (loc. cit.).

Preparation of 4-cyano-3-methoxy-5-phenylisothiazole

A mixture of 4-bromo-3-methoxy-5-phenylisothiazole (2.7 g., 10 mmole), cuprous cyanide (2.7 g., 30 mmole) and dimethylformamide (4 ml.) was stirred and heated to reflux for one hour. The reaction mixture was shaken with warm, aqueous sodium cyanide (2 g., in 6 ml.) and extracted with ether (2×20 ml.). The combined ether extracts were extracted with 10% aqueous sodium cyanide (10 ml.) and cold water (2×10 ml.) and dried over magnesium sulfate with some decolorizing carbon. The mixture was filtered and the ether removed on a rotary evaporator and finally under high vacuum to give fine white needles, 2.05 g. (95%), M.P. 98–100° C. The infrared absorption spectrum was in agreement with the suggested formula.

4-carboxamido-3-methoxy-5-phenylisothiazole 4-cyano-3-methoxy-5-phenylisothiazole (1.9 g., 8.8 mmole) was dissolved in concentrated sulfuric acid (10 ml.) and left at 50–60° C. for 12 hours. The mixture was then poured into ice and water (500 ml.) and a white solid separated. The solid was extracted with ethyl acetate (2×250 ml.) and the combined ethyl acetate extract washed with cold water (3×20 ml.). The ethyl acetate layer was dried over magnesium sulfate, filtered, and the ethyl acetate removed on a rotary evaporator and the residue was dried under high vacuum to yield 1.9 g. (92%) of the amide, M.P. 178–180° C. with the expected infrared absorption spectrum.

3-methoxy-5-phenylisothiazole-4-carboxylic acid

A solution of sodium nitrite in water (0.7 g., 9.5 mmole in 3 ml.) was added dropwise to a cold (0–5° C.) well-stirred solution of 4-carboxamido-3-methoxy-5-phenylisothiazole (1.75 g., 7.5 mmole) in sulfuric acid (15 ml. of a 70% solution). After the addition the mixture was stirred for 30 minutes at ambient temperature and 20 minutes at 50–60° C. and then poured over crushed ice (250 ml.). The precipitated solid was filtered, dissolved in methylene chloride (200 ml.) and the solution extracted with cold water (3×20 ml.), dried over magnesium sulfate, filtered, and the methylene chloride removed on a rotary evaporator to give 1.7 g. (97%) of the crude acid. Recrystallization from benzene-hexane gave 1.57 g. of fine needles, M.P. 162–163° C., whose experimental equivalent weight (230) and infrared absorption spectrum agreed with the above formula.

In a subsequent experiment it was found possible to prepare the acid in good yield without prior isolation of the amide.

3-methoxy-5-phenylisothiazole-4-carbonylchloride 3-methoxy-5-phenylisothiazole-4-carboxylic acid (1.4 g., 5.9 mmole) and freshly distilled thionyl chloride (7 ml.) were heated under reflux for one hour and the excess thionyl chloride removed on a rotary evaporator. The product crystallized from hexane to give 1.39 g. (91%) of the acid chloride, M.P. 43–45° C.

In a subsequent experiment the acid chloride was distilled and had B.P. 127–128° C./0.2 mm.; 135–136° C./0.8 mm.

Potassium 6-[3′-methoxy-5′-phenylisothiazol-4′-ylformamido]penicillanate

A stirred suspension of 6-aminopenicillanic acid (1.181 g., 5.46 mmole) in water (10 ml.) was adjusted to a pH 7.2 with normal sodium hydroxide, and acetone (10 ml.) added, followed by addition of 3-methoxy-5-phenylisothiazole-4-carbonylchloride (1.386 g., 5.46 mmole). The mixture was stirred for one hour at room temperature and one hour at 0° C. and most of the acetone was removed in a current of air. The mixture was extracted with ether (3×20 ml.) and the combined ether extracts were washed with cold water (2×10 ml.) and were dried over magnesium sulfate for ten minutes in an ice bath. The mixture was filtered and a solution of potassium-2-ethylhexanoate in butanol (2.5 mole, 2.2 ml.) added in one lot with rapid swirling of the flask. A light yellow wax separated. The supernatant liquid was decanted and the wax was dissolved in the minimum amount of cold methanol and was reprecipitated by the addition of ether. The supernatant liquid was removed by decantation and the waxy solid was dissolved in the minimum of cold methanol and this solution was poured into a stirred excess of ether at ice temperature. A light yellow solid resulated which was gathered by filtration and was dried over phosphorus pentoxide at room temperature under a high vacuum. The yield was 1.376 g. (53%). The material contained a trace of methanol and was estimated to be 90% pure from the thin layer chromatogram, nuclear magnetic resonance spectrum and infrared absorption spectrum.

This penicillin exhibited Minimum Inhibitory Concentrations in vitro versus *Staph. aureus* Smith of about 0.125–0.25 mcg./ml. and versus the benzylpenicillin-resistant *Staph. aureus* Bx–1633–2 of about 0.8 mcg./ml. and in vivo upon administration to mice exhibited $CD_{50}$'s versus *S. aureus* Bx–1633–2 of about 45 mgm./kg. i.m. and 280 mgm./kg. p.o.

EXAMPLE 2

Large-scale preparation of potassium 6-[3′-methoxy-5′-phenylisothiazol-4′-ylformamido]penicillanate A suspension of 6-aminopenicillanic acid (13.88 g.), in water (100 ml.) was brought to pH 7.2 by the addition of normal sodium hydroxide with efficient stirring and cooling in ice water. To the resulting homogeneous solution, a solution of 3-methoxy-5-phenylisothiazole-4-carbonyl chloride (16.29 g.) in pure acetone (100 ml.) was added. The ice bath was removed and the mixture was vigorously stirred at room temperature for one hour. About one-half of the acetone was removed by vacuum distillation at below room temperature. The thick oil which separated was extracted with ether and the solution was briefly dried over magnesium sulfate. The filtered solution was poured into a vigorously-stirred solution of 2.5 molar potassium 2-ethyl-hexanoate in 1-butanol (25.7 ml.). The waxy solid which separated was isolated by decantation and dissolved in the minimum amount of methanol (about 100 ml.). This solution was poured into ether (1.5 l.) with stirring. The precipitate was isolated and the procedure repeated once more to give 23.0 g. (78% yield) of a faintly yellow solid. The infrared absorption spectrum and nuclear magnetic resonance spectrum fully substantiate the assigned structure and require virtual chemical purity.

EXAMPLE 3

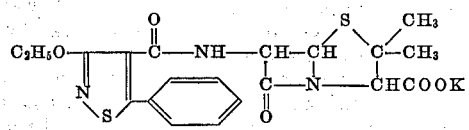

3-ethoxy-5-phenylisothiazole was made in an analogous manner to 3-methoxy-5-phenylisothiazole, following the procedure of J. Goerdeler and W. Mittler, Chem. Ber. 96, 944 (1963) and had B.P. 117–121° C. (0.7 mm.) (reported 67° C., 0.01mm.).

The 3-ethoxy-5-phenylisothiazole was treated with bromine in acetic acid to give 4-bromo-3-ethoxy-5-phenylisothiazole, yield 85%, B.P. 128–131° C., (0.5 mm.). The 4-bromo-3-ethoxy-5-phenylisothiazole on heating under reflux with cuprous cyanide in dimethylformamide for 45 minutes gave 4-cyano-3-ethoxy-5-phenylisothiazole, yield 93%, M.P. 72–78° C. The 4-cyano-3-ethoxy-5-phenylisothiazole on treatment with concentrated sulfuric acid at 55–60° C. gave 4-carboxamido-3-ethoxy-5-phenylisothiazole, yield 98%, M.P. 165–180° C., which with nitrous acid gave 3-ethoxy-5-phenylisothiazole-4-carboxylic acid, yield 90%, M.P. 124–127° C. with the expected infrared spectrum and neutralization equivalent. The 3-ethoxy-4-phenylisothiazole-4-carboxylic acid on heating under reflux with thionyl chloride gave 3-ethoxy-5-phenylisothiazole-4-carbonyl chloride, yield 79%, B.P. 138–140° C. (0.7 mm.).

6-aminopenicillanic acid (1.36 g., 6.3 mmole) in water (10 ml.) was carefully treated with normal sodium hydroxide until the pH of the solution was 7 to 7.1. Acetone (5 ml.) was added and the mixture cooled in an ice bath. The acid chloride (1.68 g., 6.3 mmole) was added and the mixture stirred for one hour at ambient temperature when a white solid separated. Most of the acetone was removed by a stream of air and the reaction mixture extracted with ether (4×25 ml.). The combined ether extract was washed with cold salt water (2×25 ml.) and dried briefly over magnesium sulfate. Potassium 2-ethylhexanoate in n-butanol (2.5 ml. of a 2.5 mole solution) was added to the filtrate when a white solid separated. The solid was filtered, dissolved in the minimum of cold methanol and reprecipitated with ether, filtered and dried for 24 hours over phosphorous pentoxide to give potassium 6 - [3' - ethoxy - 5' - phenylisothiazol - 4' - ylformamido]penicillanate, yield 77%, 2.34 g. The thin-layer chromatogram, infrared absorption spectrum and nuclear magnetic resonance spectrum indicated that the compound was 95% pure.

This penicillin exhibited Minimum Inhibitory Concentrations in vitro versus *Staph. aureus* Smith of about 0.25–5.0 mcg./ml. and versus the benzylpenicillin-resistant *S. aureus* Bx–1633–2 of about 1.6 mcg./ml.

EXAMPLE 4

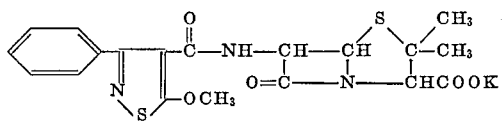

β-Imino-β-phenylpropionitrile

For the preparation of this compound the procedure of Dornow, Kuhlcke and Baxmann (6) was modified as follows:

Granular sodium (92 g., 4.0 mole) (2) was added in portions over a three hour period to an efficiently stirred mixture of aceonitrile (164 g., 4.0 mole), benzonitrile (206 g., 2.0 mole) and toluene (500 ml.). By occasional cooling the temperature of the reaction mixture was kept at 70–80° C. during the addition of the sodium. After the addition was complete the reaction mixture was left at room temperature overnight. The solid was filtered off and washed with ether on the filter. In order to remove all the solvent completely, the solid material was left at 50° C. under reduced pressure for several hours. It was next dissolved in cold methanol (500 ml.) and the thus obtained solution was poured into ice water (1500 ml.). The yellow solid was filtered off, washed with water and air-dried. The material was recrystallized from a mixture of benzene (400 ml.) and petroleum ether (200 ml.) to give 160 g. (56%) of pale yellow product, M.P. 82–86° C., sufficiently pure for the next step. Reported M.P. 89–90° C.

β-Imino-β-phenylthiopropionamide

A stream of hydrogen sulfide was passed through a stirred solution of β1imino-β-phenylpropionitrile (84 g., 0.58 mole) in 500 ml. of pyridine at 100–105° C. for 8 hours. The pyridine was distilled off under reduced pressure and benzene (250 ml.) was added to the deep red colored residue. The yellow colored plates, M.P. 162–167° C., were filtered off and amounted to 75 g. (38%). Reported M.P. 174° C. (7).

When the filtrate was concentrated under reduced pressure and ether was added to the residue an orange colored precipitate resulted which was filtered off and amounted to 15.0 g. and melted at 110–115° C. After two recrystallizations from benzene there was obtained 8.8 g. of intensely orange colored plates, M.P. 125–126° C. The nuclear magnetic resonance spectrum (CDCl₃) contained a sharp singlet at τ2.57 and a multiplet centered at τ2.44 with an integration ratio of approximately 1:5. The compound did not contain any nitrogen and is believed to be 5-phenyl-1,2-dithiole-3-thione.

*Analysis.*—Calc'd for $C_9H_6S_3$: C, 51.39; H, 2.88; S, 45.74. Found: C, 52.24; H, 2.70; N, 45.20.

5-amino-3-phenylisothiazole

This compound was prepared by the method employed by Goerdeler and Pohland (7), with some minor modifications.

A solution of iodine (76.2 g., 0.30 mole) in 1.4 l. of methanol was added dropwise in three hours to a stirred mixture of β-imino-β-phenylthiopropionamide (54.0 g., 0.30 mole), potassium carbonate (89.0 g., 0.60 mole) and 1.4 l. of methanol. The temperature of the reaction mixture was maintained at 30–35° C. The solution was next concentrated under reduced pressure to a volume of approximately 600 ml. and poured into 2.5 l. of ice water. The solid was filtered off and air-dried. The product was recrystallized from a mixture of ethyl acetate (350 ml.) and petroleum ether (300 ml.) to give 37.5 g. (71%) of pale yellow solid, M.P. 160–161° C. Reported M.P. 163° C. (7).

4-bromo-5-amino-3-phenylisothiazole

A solution of bromine (33.9 g., 0.212 mole) in 200 ml. of glacial acetic acid was added dropwise in 40 minutes to a stirred solution of 5-amino-3-phenylisothiazole (37.5 g., 0.212 mole) in 400 ml. glacial acetic acid. The temperature of the reaction mixture was kept at 15–20° C. A precipitate of 4-bromo-5-amino-3-phenylisothiazole hydrobromide formed readily. After all the bromine had been added, 400 ml. of either was added to the reaction mixture, the hydrobromide was filtered off and washed with ether. There was obtained 60 g. (80%) of almost white salt. This salt was suspended in 300 ml. of water, followed by the addition of 300 ml. of ether and a solution of potassium carbonate (50 g., 0.36 mole) in 100 ml. of water. The mixture was shaken until all solid material had disappeared. The ether layer was separated and the aqueous layer extracted with some more ether. The combined ether solutions were dried and the solvent removed. The residue, which slowly solidified, was dissolved in a small amount of benzene and precipitated, with scratching the walls of the flask, by the addition of hexane. There was obtained 42 g. (78% overall yield) of pale yellow solid, M.P. 77–82° C. One more recrystallization from benzene-hexane raised the melting point to 83–85° C.

4-bromo-3-phenylisothiazole 4-bromo-5-amino-3-phenylisothiazole (40.0 g., 0.157 mole) was added in portions under stirring, to 60 ml. of concentrated sulfuric acid at room temperature. After all the material had dissolved in the sulfuric acid, 60 ml. of 85% phosphoric acid was added. The mixture was cooled and a solution of sodium nitrite (12.0 g., 0.174 mole) in 50 ml. of water was added dropwise in approximately 1.5 hours, while the temperature of the diazotization mixture was kept at −10 to −5° C. The thus obtained orange-colored diazotization mixture was added in portions under stirring to 225 ml. of a 50% aqueous hypophosphorous acid solution in which some cuprous oxide was suspended. During the addition the temperature of the reduction mixture was kept at 30–35° C. and occasionally an additional catalytic amount of cuprous oxide was added. Next the reaction mixture was cooled in ice and made alkaline by the careful addition of a 50% aqueous sodium hydroxide solution. The mixture was subjected to a steam distillation until approximately 4 l. of distillate had been collected. Almost all the product solidified in the condenser and was taken up in ether. The distillate was extracted twice with ether. The combined ether solutions were dried whereafter the ether was removed. There was obtained 25 g. of liquid residue which slowly crystallized and which was recrystallized from approximately 50 ml. of n-hexane to give 20.0 g. (53%) of white solid, M.P. 54–56° C. The nuclear magnetic resonance spectrum (in $CCl_4$) contained a sharp singlet at τ1.44 (isothiazole proton) and a complex pattern for the phenyl protons at τ1.9–2.8, with an integrated area ratio of 1:5 respectively.

Instead of steam distilling the product from the reaction mixture it can also be extracted with ether. The product can then finally be purified by elution chromatography over alumina using n-hexane as the eluant.

4-cyano-3-phenylisothiazole

A mixture of 4-bromo-3-phenylisothiazole (13.4 g., 0.056 mole), cuprous cyanide (7.5 g., 0.084 mole) and N,N-dimethylformamide (15 ml.) was heated under reflux for one hour. The darkly colored reaction mixture was added to a solution of sodium cyanide (10 g.) in 30 ml. of water. The mixture was shaken vigorously, then cooled. The organic material was taken up in ether and the aqueous solution was extracted with two additional portions of ether. The combined ether solutions were washed with 30 ml. of a 10% aqueous sodium cyanide solution, followed by drying over magnesium sulfate and removal of the solvent. The yellow colored oily residue was distilled in vacuo to give 8.4 g. (81%) of colorless liquid, B.P. 115–120° C. (0.2 mm.) which slowly solidified, M.P. 46–50° C. The infrared spectrum contained a sharp band at 2200 cm.$^{-1}$, ascribed to the —C≡N group.

3-phenylisothiazole-4-carboxamide 4-cyano-3-phenylisothiazole (7.6 g., 0.041 mole) was dissolved in 35 ml. of concentrated sulfuric acid. The mixture was kept at 50–55° C. for 19 hours, and was then poured on approximately 200 g. of crushed ice. The white solid was taken up in ethyl acetate (300 ml.). The ethyl acetate solution was dried, then concentrated to approximately 100 ml. (the product started to crystallize), whereafter 100 ml. of petroleum ether was added. After cooling the white solid, M.P. 132–136° C., was collected by filtration and amounted to 7.0 g. (83%). The melting point could be raised to 138–140° C. by recrystallization from benzene.

3-phenylsohiazole-4-carboxylic acid 3-phenylisothiazole-4-carboxamide (4.3 g., 0.021 mole) was dissolved in 50 ml. of concentrated sulfuric acid, whereafter 25 ml. of water was carefully added under cooling. A solution of sodium nitrite (2.15 g., 0.031 mole) in 10 ml. of water was added dropwise, under stirring, in approximately 15 minutes while the reaction mixture was cooled in ice. When the addition was completed, the reaction mixture was briefly heated on a steam bath until the nitrogen evolution ceased. It was then poured into 400 ml. of ice-water. The white solid was taken up in ethyl acetate (150 ml.). The ethyl acetate solution was dried and concentrated to a volume of approximately 50 ml. (the product started to crystallize). Next, 150 ml. of hot petroleum ether was added to the hot ethyl acetate solution and the mixture was allowed to cool. The white solid, M.P. 163–165° C., was filtered off and amounted to 3.8 g. (88%). The nuclear magnetic resonance spectrum of the potassium salt in $D_2O$ contained a sharp singlet at τ0.93 (isothiazole proton) and a complex pattern for the phenyl protons at τ2.1–2.7 with an integrated area of 1:5 respectively. The infrared spectrum (Nujol mull) contained a sharp band at 1700 cm.$^{-1}$ ascribed to the carbonyl group.

Analysis.—Calc'd for $C_{10}H_7NO_2S$ (mol. wt. 205.2): C, 58.52; H, 3.44; N, 6.83; S, 15.62. Found: C, 58.28; H, 3.68; N, 7.01; S, 15.80; neutrtalization equivalent, 204.

5-bromo-3-phenylisothiazole-4-carboxylic acid

A 1.6 M solution of n-butyllithium in n-hexane (40 ml., 0.064 mole) was added dropwise in 15 minutes to a stirred solution of 3-phenylisothiazole-4-carboxylic acid (5.5 g., 0.027 mole) in 100 ml. of anhydrous tetrahydrofuran, kept at −70 to −60° C. The addition was carried out in a nitrogen atmosphere. When the addition was complete, bromine (11.2 g., 0.070 mole) was added in one portion to the intense red colored solution. The temperature was allowed to rise to 0° C., then the reaction mixture was added to 50 ml. of 20 N aqueous sodium hydroxide. The aqueous was shaken and the organic layer removed. The aqueous layer was extracted twice with ether, then cooled and acidified with 75 ml. of 3 N aqueous sulfuric acid. The precipitated oil was taken up in ether and the ether solution was dried. Removal of the solvent yielded 5.5 g. (73%) of pale yellow colored highly viscous oil, which slowly solidified to a solid melting at 96–104° C. The infrared spectrum of the oil showed a strong band at 1720 cm.$^{-1}$, ascribed to the carbonyl group. Neutralization equivalent: 276 (experimental), 284 (calc'd.).

Methyl 5-bromo-3-phenylisothiazole-4-carboxylate

A 0.3 M ethereal diazomethane solution (100 ml.) was added to an ice-cold solution of 5-bromo-3-phenylisothiazole-4-carboxylic acid (5.5 g., 0.0193 mole) in 30 ml. of ether. The mixture was left at room temperature for 30 minutes, whereafter the excess of diazomethane was destrtoyed with some acetic acid. The ether solution was washed once with a 10% aqueous sodium solution, then dried. Removal of the solvent yielded 5.2 g. (88%) of a yellow colored oil. The infrared spectrum of the neat liquid contained a strong band at 1730 cm.$^{-1}$, ascribed to the ester carbonyl group.

Methyl 5-methoxy-3-phenylisothiazole-4-carboxylate

Sodium (0.69 g., 0.030 g. at.) was allowed to react with 10 ml. of methanol. To the resulting sodium methoxide solution, cooled in ice, was added a solution of methyl 5-bromo-3-phenylisothiazole-4-carboxylate (4.5 g., 0.015 mole) in 50 ml. of dimethylsulfoxide. A deep red color developed. The mixture was left at room temperature for one hour, then poured into 400 ml. of ice water and extracted with three 100 ml. portions of ether. The combined ether extracts were dried and the solvent removed to give 1.5 g. of oil. The infrared spectrum of the neat liquid showed a strong band at 1720 cm.$^{-1}$, ascribed to the ester carbonyl group. The infrared spectrum indicated the absence of any starting material.

5-methoxy-3-phenylisothiazole-4-carboxylic acid

Methyl 5 - methoxy-3-phenylisothiazole-4-carboxylate (1.5 g., 0.006 mole) was dissolved in 3 ml. of methanol, followed by the addition of 3 ml. of a 3 N methanolic sodium hydroxide solution. The reaction mixture was left at room temperature overnight during which it solidified. Most of the methanol was removed under reduced pressure. After the addition of 50 ml. of ether, the sodium salt of the desired acid was filtered off. The salt was dissolved in 25 ml. of water and this solution was acidified with 3 N aqueous sulfuric acid. The white precipitate was collected and dried over phosphorous pentoxide in vacuo.

The product, M.P. 158–160° C. (dec.), amounted to 0.54 g. (15%, based on methyl 5-bromo-3-phenylisothiazole-4-carboxylate). The infrared spectrum (Nujol mull) contained a strong band at 1690 cm.$^{-1}$, ascribed to the carbonyl group. The nuclear magnetic resonance spectrum (CDCl$_3$) contained an OH singlet at τ1.20, a multiplet for the phenyl protons at τ2.4–2.9 and an OCH$_3$ singlet at τ6.17, with an integrated area ratio of 1:5:3 respectively. Neutralization equivalent: 234 (experimental), 235 (calc'd.). An analytical sample, M.P. 163–165° C. (dec.), was recrystallized from benzene-petroleum ether (1:1).

3-methoxy-3-phenylisothiazole-4-carbonyl chloride

A mixture of 5-methoxy-3-phenylisothiazole-4-carboxylic acid (0.44 g., 0.0019 mole) and thionyl chloride (5 ml.) was refluxed for one hour, whereafter the excess of thionyl chloride was removed completely in vacuo. There was obtained 0.44 g. of residual oil which slowly solidified. The infrared spectrum of the neat liquid contained a strong band at 1750 cm.$^{-1}$, indicative of a carbonyl group.

Potassium 6-[5'-methoxy-5'-phenylisothiazol-4'-ylformamido]penicillanate 6-aminopenicillanic acid (0.41 g., 0.0019 mole) in 15 ml. of water was carefully treated with 1 N aqueous sodium hydroxide until the pH of the solution was 7.5. Acetone (7 ml.) was then added, followed by a solution of 5 - methoxy-3-phenylisothiazole-4'-carbonyl chloride (0.44 g., 0.0017 mole) in 10 ml. of acetone. The homogeneous solution was left at room temperature for one hour whereafter most of the acetone was removed under reduced pressure. The waxy material was taken up in ethyl acetate (25 ml.) and the aqueous layer extracted again with some ethyl acetate (20 ml.). The combined ethyl acetate extracts were dried and a 2.5 M solution of potassium 2-ethyl-hexanoate in n-butanol (1.0 ml.) was added, followed by 50 ml. of ether. The penicillin precipitated as an oil which was twice taken up in a small amount of methanol (2 ml.) and reprecipitated with ether. It was finally kept in vacuo over phosphorous pentoxide for 20 hours. There was obtained 0.24 g. of pale yellow solid, the identity of which was established by infrared and nuclear magnetic resonance spectroscopy and thin-layer chromatography.

This penicillin exhibited Minimum Inhibitory Concentrations in vitro versus *S. aureus* Smith of about 2.5 mcg./ml. and versus the benzylpenicillin-resistant *S. aureus* Bx–1633–2 of about 1.6 mcg./ml.

EXAMPLE 5

Substitution in the procedure of Example 1 for the methyl benzoate used therein of methyl 2,6 - dichlorobenzoate produces potassium 6 - [3 - methoxy - 5 - (2', 6' - dichlorophenyl)isothiazole - 4-carboxamido]penicillanate.

EXAMPLE 6

Substitution in the procedure of Example 1 for the methyl benzoate used therein of methyl o-chlorobenzoate produces potassium 6 - [3 - methoxy - 5 - (2' - chlorophenyl)isothiazole-4-carboxamido]penicillanate.

EXAMPLE 7

Substitution in the procedure of Example 1 for the methyl benzoate used therein of methyl 4-trifluoromethylbenzoate produces potassium 6 - [3 - methoxy - 5 - (4'-trifluoromethylphenyl)isothiazole - 4 - carboxamido] penicillanate.

EXAMPLE 8

Substitution in the procedure of Example 4 for the benzonitrile used therein of 2,6 - dichlorobenzonitrile produces potassium 6 - [5 - methoxy - 3 - (2',6'-dichlorophenyl)-4-carboxamido]-penicillanate.

Also included within the scope of the present invention because of their utility as intermediates for the preparation of useful penicillins are the compounds of the formulae

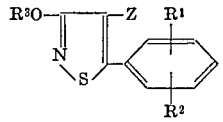

and

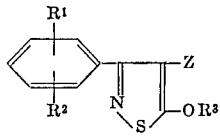

wherein Z represents —CN, —CONH$_2$ or —COOH, and R$^3$ represents (lower)alkyl and R$^1$ and R$^2$ each represent hydrogen, chloro or trifluoromethyl.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

What is claimed is:
1. The compounds of the formulae

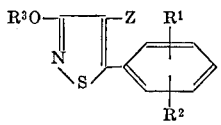

and

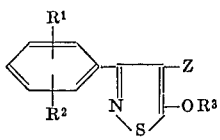

wherein Z represents —CN, —CONH$_2$ or —COOH, and R$^3$ represents (lower)alkyl and R$^1$ and R$^2$ each represent hydrogen, chloro or trifluoromethyl.

2. The compounds of claim 1 having the formulae

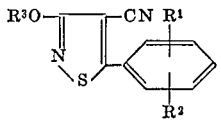

and

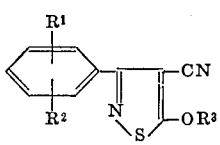

wherein R$^3$ represents (lower)alkyl and R$^1$ and R$^2$ each represent hydrogen, chloro or trifluoromethyl.

3. The compounds of claim 1 having the formulae

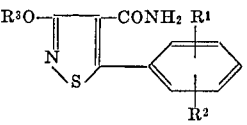

and

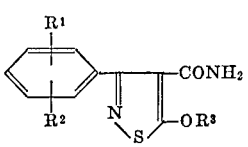

wherein R$^3$ represents (lower)alkyl and R$^1$ and R$^2$ each represents hydrogen, chloro or trifluoromethyl.

4. The compounds of claim 1 having the formulae

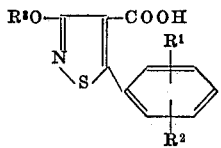

and

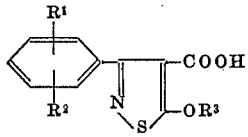

wherein R³ represents (lower)alkyl and R¹ and R² each represents hydrogen, chloro or trifluoromethyl.

5. The compounds of claim 1 having the formulae

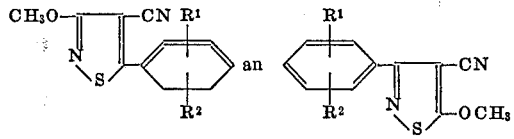

wherein R¹ and R² each represent hydrogen, chloro or trifluoromethyl.

6. The compounds of claim 1 having the formulae

CH₃O—⧸═⧹—CONH₂  R¹           R¹
      N   S            and          N═⧸⧹—CONH₂
                                    S   OCH₃
         R²             R² wherein R¹ and R² each represent hydrogen, chloro or trifluoromethyl.

7. The compounds of claim 1 having the formulae

CH₃O—⧸═⧹—COOH  R¹            R¹
      N   S            and          N═⧸⧹—COOH
                                    S   OCH₃
         R²             R² wherein R¹ and R² each represent hydrogen, chloro or trifluoromethyl.

8. The compound of claim 1 which is 4-cyano-3-methoxy-5-phenylisothiazole.

9. The compound of claim 1 which is 4-carboxamido-3-methoxy-5-phenylisothiazole.

10. The compound of claim 1 which is 3-methoxy-5-phenylisothiazole-4-carboxylic acid.

References Cited

UNITED STATES PATENTS 3,155,678   11/1964   Hatchard _____ 260—302

ALTON D. ROLLINS, Primary Examiner